Oct. 16, 1934.  F. SCHLAYER  1,977,149
AXIAL THRESHING MACHINE
Filed Aug. 8, 1930
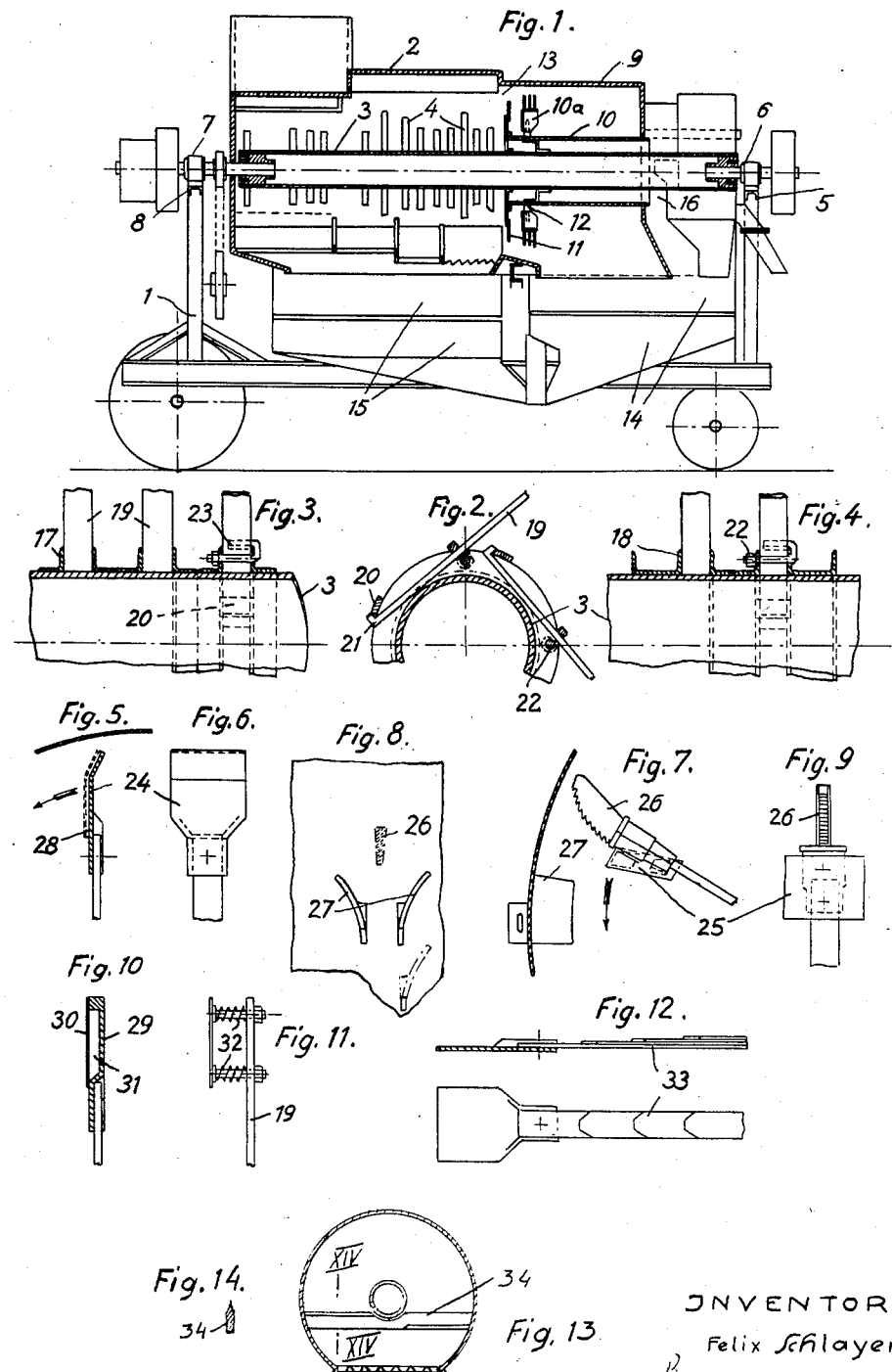
INVENTOR:
Felix Schlayer Patented Oct. 16, 1934

1,977,149

UNITED STATES PATENT OFFICE 1,977,149

AXIAL THRESHING MACHINE

Felix Schlayer, Madrid, Spain

Application August 8, 1930, Serial No. 473,924
In Austria August 9, 1929

11 Claims. (Cl. 130—27)

The present invention relates to improvements in axial threshing machines or axial threshing and straw reducing machines of the type described and claimed in my co-pending application, Ser. No. 368,221, of June 4, 1929, which, owing to the special selection and arrangement of the stationary and revolving working members, are equipped for producing litter straw which is loosened up mechanically and pneumatically for subsequent sieving in a hood provided at the discharge end of the machine drum. The straw passes into the hood through an annular gap limited inside by an end disc which, together with the rear bearing of the shaft, is supported by a carrier crossing the gap twice. The shaft end extending beyond the rear bearing serves for driving the means working within the hood and being secured preferably to an aspirating cylinder passing through the hood.

According to the invention, the passage from the working space to the hood is perfectly free on all sides, and the beater shaft carrying the rotary members of the working space or hood as well as the end disc is constructed hollow and disposed towards the end of the hood.

The invention affords the advantage of avoiding the heavy congestion of straw at the bearing carrier and the stationary end disc observed in the older machine. Furthermore, the hollow shaft with inserted journals is sufficiently rigid, or can be made so easily by simple means, without resorting to the otherwise necessary enlargement of the diameter of both the shaft and the bearing, and, finally, the revolving means for after-treatment in the hood are firmly positioned and the aspirating cylinder may be well centered.

As the considerable length of the hollow shaft and the strain to which it is subjected by the attached beaters involve the possibility of harmful oscillations which might have detrimental effects resulting in knocking of tools, the invention further provides that the hollow shaft be reinforced by flanged metal rings which are preferably utilized for securing the beater arms.

The accelerated passage of the threshing material due to the provision of perfectly free discharge from the working space to the hood has led to a remarkable change of the rotary and stationary threshing and straw reducing members, in order to insure particularly better sieving of the grain and sufficient softening of the straw. To harmonize the sifting effect with the accelerated passage of the straw, all rotary working tools of the machine drum are bent rearwardly at their extreme ends, whereby increased centrifugal pressure of the threshing material against the walls and sieves is produced, which facilitates sieving.

Another feature of the invention to increase sieving is the arrangement of wind vanes, adjusted to the motion of the threshing material, on the carriers of the straw reducing tools for keeping the sieves or saw-like grates free from straw by thorough aeration and facilitating thereby the passage of the grain. The wind vanes serve the further purpose of assisting considerably in the centrifugal forcing away of the threshing material towards the inner wall of the drum by the bent tools.

The form of the beater plates in the threshing section of the machine involves a slightly extended contact of the plates with the ears to be threshed and, therefore, a somewhat rougher treatment of them. To prevent the danger of breaking the grain, the action of the threshing plates, according to the invention, is softened by lining them with material softer than metal or by interposing buffer-like means between the beaters and the plates or by constructing the beaters themselves in a more yielding way.

To insure sufficient softening of the straw even in cases where special stress is laid on soft straw, it is further proposed to uniformly retard the conveyance of the straw in the end portion of the cylinder by providing the beaters, normally equipped with three reducing blades, only with the central one and, in order to catch for treatment all the straw in rotation, by causing two counter-bodies on the cylinder walls to form a funnel having such a shape that they shut off a considerably larger passage area and thus catch the straw in larger strips than the counter-blades hitherto in use.

The invention is illustrated by way of example in the accompanying drawing, in which Figure 1 is a vertical longitudinal medial section of an axial threshing and straw reducing machine; Fig. 2, a cross section of the hollow shaft; Fig. 3, a longitudinal section of a hollow shaft fitted with angular reinforcements; Fig. 4, a longitudinal section of a hollow shaft fitted with U-shaped reinforcements; Fig. 5, a side view of a beater plate; Fig. 6, a front view thereof; Fig. 7, a side view of a pair of cooperating stationary and revolving working members; Fig. 8, a front view of the stationary member of this pair; Fig. 9, a front view of the revolving member of the pair; Fig. 10, a medial section of a modification of a beater plate; Fig. 11, a side view thereof; Fig. 12 gives two views of a beater arm constructed as leaf spring; Fig. 13 is a cross section of a modification of the reducing portion of the machine; and Fig. 14, a section on the line XIV—XIV, of Fig. 13.

Referring to the drawing, the axial threshing and straw reducing machine comprises a frame 1 carrying the drum 2 with the shaft 3, the beaters 4 of which, shown only partially and diagrammatically in Fig. 1, cooperate with counter-members (not shown) secured to the wall of the machine drum. The shaft 3 is hollow and extends up to the rear carrier 5 of the frame where it is positioned at 6. The front bearing 7 is found on the front carrier 8.

The hollow shaft 3 passes through the hood 9 connected with the rear end of the drum. Within the hood, the aspirating cylinder 10 rotates which is driven also by the hollow shaft 3 and maintained in position relative to the latter. On the cylinder are disposed the rotary members 10a. 11 is the end disc attached to the hollow shaft, provided with the central air passages 12 and forming with the wall of the drum the annular gap 13 which is free on all sides and through which straw adapted to be used as litter can enter the hood 9 without any trouble and then the shaking device 14 after being loosened up by the members 10a. 15 is the shaking device for the grain and short straw particles coming from the working space.

The hollow shaft 3 may be disposed also directly behind the hood 9 at 16 and possibly extended beyond the bearing 6 by means of a somewhat yieldingly connected thinner shaft.

The hollow shaft 3 is reinforced by the L- or U-shaped or otherwise flanged rings 17, 18 which are firmly attached thereto and secured by riveting or other suitable means. The rings serve also as carriers for the beater arms 19 flanked on both sides by the ring flanges to prevent their moving transversely to the direction of rotation. The beater arms 19 are secured to the rings by having their bent end engaging the cross plate 20 which is placed between the rings and by means of hooks 23 which surround the beater arms and pass through the rings. The hooks are secured to the rings by bolts 22. A wedge may be interposed between the hook and arm if necessary. The plates and bolts form connections of the rings so that the uninterrupted succession of rings and beater arms produces a continuous reinforcement for the shaft extending over the entire length thereof.

For the reasons stated the plate-like tool 24, according to Figs. 5 and 6, is bent transversely to the longitudinal axis of the beaters so that the working surface recedes from the base of the tool to its free end. The blade-like tools (Fig. 7) toothed in the known manner are curved correspondingly, the curvature being greater at the free end. Construction according to the invention is independent of the number of blades fitted to a tool. 25 are the wind vanes mentioned already in the introduction.

Furthermore, in the reducing section of this litter producing machine rotary tools are employed which are fitted only with one blade 26 and which cooperate with counter-members forming a sort of funnel 27, as indicated by Figs. 7 to 9. The ample funnel opening receives the straw in broad strips, the straw being subsequently forced between the approaching walls by the rotary blade and squeezed soft.

The special means provided by the invention to soften the impact of the rotary tools consists, according to Figs. 5 and 6, in fitting the working surface of the metal beater plate 24 with a suitably secured covering 28 of soft material, such as wood, artificial resin, rubber, fiber and the like. In Fig. 10 the working surface of the beater plate 29 is made of the sheet metal 30 under which a space 31 is provided which is either empty or filled with yielding material. Fig. 11 shows how the springs 32 are positioned between the beater plate and the beater arm 19 to attain the desired end, while Fig. 12 discloses particularly soft cushioning in the arm 33 itself by manufacturing it from laminated thin spring plates like a leaf spring.

The right-hand element of the pair of counter-members 27 facing in Fig. 8 the outlet end of the machine may be staggered in the direction of rotation of the finger 26 so that its upper outwardly pointing edge is positioned approximately on a level with the lower edge of the front left element, as indicated by hatched lines. The elements may be constructed also as blades and form, in suitable manner, a funnel-like shape. The advantages derived from arranging the elements in staggered relation are, among other things, a reduction of the power requirement of the machine and of the danger of breakdown, as two engagements take place instead of one and the finger can turn aside.

A good reducing effect at little congestion of straw can be attained also if, according to Figs. 13 and 14, in the reducing section narrow and low blades 34 are employed which are positioned transversely to the beater shaft 3 and as closely as possible above or below it and which extend from one wall of the machine casing to the opposite one. The number of these blades, which are preferably arranged so as to be readily attachable and removable, depends on the desired degree of fineness of the straw. Where they cross the shaft, the blades may be recessed to insure closer approach to the shaft.

I claim:—

1. A machine of the character set forth comprising a casing, stationary members on the inside of the casing, the said stationary members being arranged in pairs and the members of a pair being spaced from each other and oppositely inclined to form a funnel shaped space in the direction of rotation of the rotary members, said members rotating in a plane correlated to each of these pairs of members and intended to pass through the funnel space formed by the two bodies.

2. A machine of the character set forth comprising a casing, stationary members on the inside of the casing and rotary members cooperating therewith, the said stationary members being arranged in pairs disposed on the opposite sides of the rotating path of a rotating member, said stationary members gradually approaching the path of rotation of the rotating member in the direction of rotation thereof.

3. An axial threshing machine comprising a casing with an inlet at one end, a central disc forming an outlet with the casing, a hood directly behind the outlet, a shaft arranged in the casing and the hood and journalled in bearings at the inlet end and the end of the hood, the said disc being secured to and rotating with the shaft, revolving members mounted for rotation with the shaft and provided within the casing and the hood, the hood containing an aspirating cylinder extending from the central disc toward the rear of the hood, the said cylinder surrounding the shaft and being connected thereto to revolve therewith, the revolving members of the hood being only secured to the cylinder, and the disc having openings adapted to establish communication between the interiors of the machine casing and the cylinder.

4. A rotary element for axial threshing machines and the like comprising a hollow shaft, reinforcing flanged metal rings surrounding and fastened to said shaft and beater arms mounted between and fastened to the flanges of adjacent reinforcing rings, whereby the uninterrupted succession of rings and beater arms produces a continuous reinforcement for the shaft.

5. An axial threshing machine comprising a casing, a hollow shaft, metal rings firmly arranged on the hollow shaft and provided with right angled flanges, working members carried by the metal rings and engaged by the flanges laterally, said flanges preventing lateral motion of the working members, an intake for said casing and an outlet therefor.

6. An axial threshing machine comprising a casing, a hollow shaft, metal rings firmly arranged on the hollow shaft and having right angled flanges, working members carried by the metal rings and engaged by the flanges laterally, every two correlated flanges inclosing the working members firmly between them, an intake for said casing and an outlet therefor.

7. An axial threshing machine comprising a casing, a hollow shaft, metal rings firmly arranged on the hollow shaft and having right angled flanges, working members carried by the metal rings and engaged by the flanges laterally, every two correlated flanges belonging to separate rings inclosing the members firmly between them and being firmly connected with one another, an intake for said casing and an outlet therefor.

8. An axial threshing machine comprising a casing, a hollow shaft, metal rings firmly arranged on the hollow shaft and having right angled flanges, working members carried by the metal rings and engaged by the flanges laterally, every two correlated flanges belonging to separate rings inclosing the members firmly between them and firmly interconnected, the rings and rotary members being arranged in uninterrupted order and forming a self-contained reinforcement, an intake for the casing and an outlet therefor.

9. A rotary element for axial threshing machines and the like, comprising a hollow shaft, reinforcing rings of L-shape cross section surrounding and fastened to said shaft, working members carried by the rings and engaging the flanges of the rings laterally, the flanges of every two correlated rings enclosing the members firmly between them.

10. A rotary element for axial threshing machines and the like, comprising a hollow shaft, metal rings of U-shape cross section firmly arranged on the hollow shaft, working members carried by the metal rings and engaging the flanges of the U-shaped rings laterally, every two correlated flanges belonging to separate rings enclosing the members firmly between them and being firmly connected with one another.

11. An axial threshing machine comprising a casing, an inlet and an outlet, a shaft passing through said casing, and an uninterrupted succession of reinforcing flange rings fastened to and surrounding said shaft, with beater arms mounted between and fastened to the flanges of adjacent reinforcing rings whereby a continuous reinforcement of the shaft is obtained.

FELIX SCHLAYER.